Nov. 8, 1938.                J. C. CURTIS                2,135,746
                              LUBRICATOR
                          Filed May 21, 1936

JOHN C. CURTIS
INVENTOR

BY John V. Renfro
ATTORNEY

Patented Nov. 8, 1938

2,135,746

UNITED STATES PATENT OFFICE 2,135,746

LUBRICATOR

John C. Curtis, Garfield Heights, Ohio, assignor to The Cleveland Rock Drill Company, Cleveland, Ohio, a corporation of Ohio Application May 21, 1936, Serial No. 81,051

13 Claims. (Cl. 184—55)

This invention relates broadly to lubricators but more particularly to improvements in air or fluid line lubricators especially adapted for use with compressed air actuated tools such as rock drills and the like.

One object of this invention is to produce an air line lubricator capable of admitting a predetermined amount of lubricant into a compressed air conveying conduit irrespective of the position of the lubricator.

Another object of this invention is to provide an air line lubricator with readily adjustable means for controlling the flow of the lubricant from the lubricator.

Another object of this invention is to produce an air line lubricator capable of admitting lubricant into a compressed air conveying conduit irrespective of the direction of travel of the compressed air through the conduit.

Another object of this invention is to provide an air line lubricator with means whereby the admission of the lubricant into the line is automatically prevented immediately after the flow of the fluid through the line has been interrupted.

Another object of this invention is to produce an improved air line lubricator which is strong, durable and efficient.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope and spirit of the invention.

Figure 1:
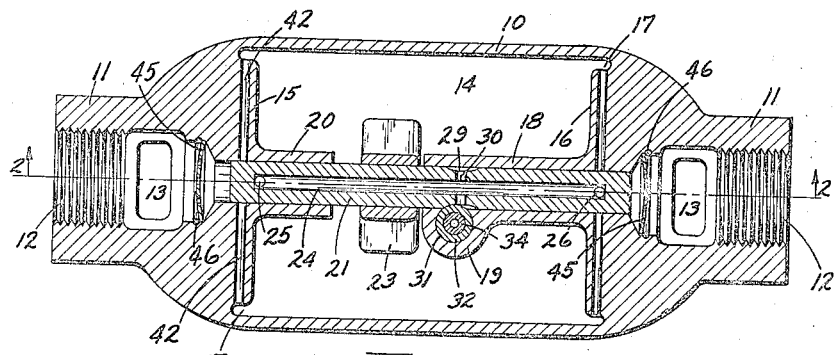
Fig. 1 is a longitudinal sectional view of the lubricator assembly.
Figure 2:
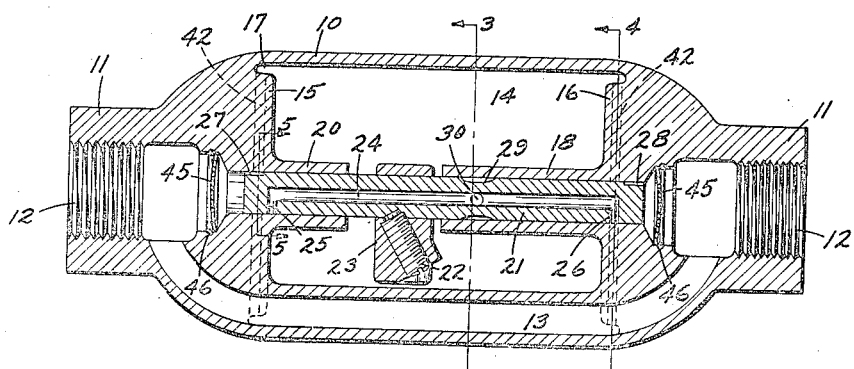
Fig. 2 is a longitudinal sectional view taken in a plane indicated by line 2—2 in Fig. 1.
Figure 3:
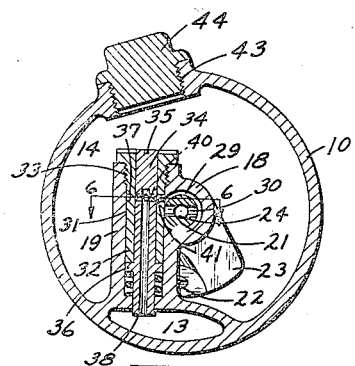
Fig. 3 is a cross sectional view taken in a plane indicated by line 3—3 in Fig. 2.
Figure 4:
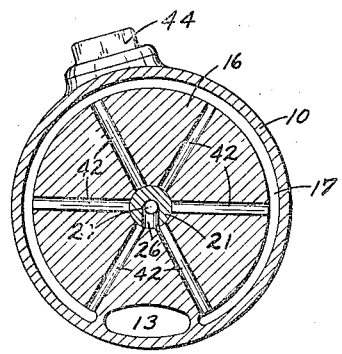
Fig. 4 is a cross sectional view taken in a plane indicated by line 4—4 in Fig. 2.
Figure 5:
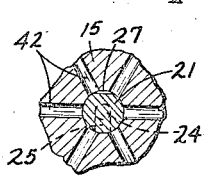
Fig. 5 is a cross sectional view taken in a plane indicated by line 5—5 in Fig. 2.
Figure 6:
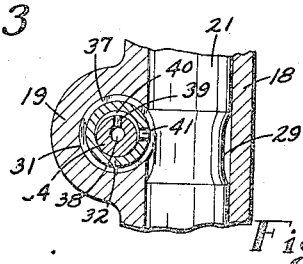
Fig. 6 is an enlarged cross sectional view taken in a plane indicated by line 6—6 in Fig. 3.

Referring to the drawing there is shown a cylindrical housing 10 formed of a single casting and terminated by hexagonal ends 11 adapted to receive a wrench by which the housing may be held stationary when screwing a connection into a threaded bore 12 formed within each end of the housing and disposed in coaxial alignment. The bores 12 are in constant communication through a pressure fluid conveying conduit 13 which is cored within the side wall of the housing 10.

Within the housing 10, there is cored a substantially cylindrical chamber or reservoir 14. This reservoir is terminated by vertical end walls 15 and 16, each projecting therein from the body of the housing to form, with the internal peripheral wall of the reservoir, an annular groove 17 which is interrupted only by the wall of the passage 13.

Extending from the end wall 16, there is a projection 18 disposed in coaxial alignment with the bores 12, and having its outer end portion integrally connected to the wall of the passage 13 by a transversely disposed rib 19 located on one side of the projection 18. From the end wall 15, there is also a projection 20 extending therefrom toward the projection 18 but terminating in spaced relation with the latter. Extending between the bottom of each threaded bore 12 through the projections 18 and 20, there is a rotatably and slidably mounted shaft 21. On the portion of this shaft located between the projections 18 and 20, is secured by a set screw 22, a weight or pendulum 23 which is capable of complete rotation within the reservoir 14.

Longitudinally disposed within the shaft 21, there is a port 24 extending almost the full length of the shaft and having one of its ends connected to the peripheral wall of the shaft by radial port 25, and the other end by a similar port 26. Leading from one end of the shaft, there is formed thereon a relatively small flat 27, and leading from the other end of the shaft there is a similar flat 28. Intermediate its ends, the shaft 21 is formed with an external annular groove 29 communicating with the port 24 through a radial port 30.

Within the boss 19 uniting the projection 18 to the wall of the passage 13, there is a bore 31 adapted to receive a bushing 32 maintained therein by a screw threaded connection 33. This bushing extends partway into the shaft's annular groove 29 for limiting the slidable movement of the shaft, and has an accurately machined bore adapted to rotatably receive a valve 34 having one end projecting into the passage 13, while the other end protrudes somewhat from the bushing 32 and is provided with a screw slot 35. The valve 34 is maintained within the bushing 32 by a spring pressed annular shoulder 36 engaging the end of the bushing. Intermediate its ends, the bushing 32 is also formed with an external annular groove 37 opening into the shaft annular groove 29. Leading from the end of the valve 34 which projects into the passage 13, there is a port 38, which opens through a radial port 39 into an eccentric groove 40 formed on the valve 34 and extending partway around the latter. This eccentric groove 40 is also capable of communication with the bushing external groove 37 through a port 41.

Formed within the side walls 15 and 16 of the reservoir 14, there is a plurality of radially disposed ports 42 which lead from the shaft 21 into the annular recesses 17. The distance between these ports adjacent the shaft 21 is calculated to be materially less than the diameter of the ports 25 and 26 and the extent of the flats 27 and 28, assuring thereby the communication of some of the ports 42 with at least one of the ports 25 and 26 and flats 27 and 28.

Immediately above the valve 34, the peripheral wall of the housing 10 is provided with a screw threaded orifice 43 adapted to receive a plug 44. To prevent the free movement of the shaft 21, there is mounted within each bore 12, a screen 45 secured therein by an annular spring clip 46.

In the operation of the lubricator, let it be assumed that lubricant has been introduced into the reservoir 14 by removing the plug 44, and that compressed air or other motive fluid is flowing from one to the other bore 12 through the passage 13. Due to the effect of the weight or pendulum 23 secured to the rotatable shaft 21, it will readily be understood that when the housing is in a substantially horizontal position, the flats 27 and 28 will always be located above the ports 25 and 26, and consequently capable of communication with radial ports 42 leading to the uppermost portion of the reservoir 14 while the ports 25 and 26 are capable of communication with other ports 42 leading to the lowermost portion of the reservoir. A portion of the motive fluid admitted into the threaded bores 12, will flow past the flats 27 or 28 which happen to be in communication with ports 42 leading into the upper part of the reservoir, thus creating pressure on the lubricant to force the latter from the lower part of the reservoir through ports 42 in communication with either port 25 or 26. From the ports 25 and 26, the lubricant is admitted into the shaft annular groove 29 via the ports 24 and 30, from where it is free to flow into the bushing annular groove 37 and port 41. By removing the plug 44 and inserting a screw driver into the screw slot 35 of the valve 34, the latter may be rotated to move the eccentric groove 40 in more or less complete communication with the port 41, thus controlling the amount of lubricant admitted into the passage 13 via the ports 39 and 38. From the passage 13, the lubricant will be carried by the motive fluid to the working parts of the machine.

When the motive fluid admitted into the bores 12 has been shut off, the pressure previously acting on the lubricant will immediately be released through the ports 42 in communication with the flats 27 or 28, thus automatically preventing the flow of the lubricant into the passage 13.

From the foregoing, it will be understood that the operation of the lubricator is not affected by its position. For instance, when the lubricator is positioned vertically, the shaft 21 will slide one way or the other until one end of its annular groove 29 engages the bushing 32, thus causing one of the flats 27 and 28 located above the lubricant to be moved in communication with radial ports 42 opening into the upper part of the reservoir, while the flat located within the lower part of the reservoir is moved out of communication with the ports 42 to prevent the flow of the lubricant therethrough. During this last position of the lubricator, one of the ports 25 and 26 located within the lower part of the reservoir will be in communication with some of the ports 42 for conveying lubricant in the manner previously described.

By rotating the valve 34, it is understood that the eccentric groove 40 may be moved in more or less complete communication with the port 41, thus providing means for selectively controlling the amount of lubricant admitted into the motive fluid conveying passage 13.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a lubricator, a housing having a lubricant reservoir and an air conduit, means for conveying lubricant from said reservoir to said air conduit during the flow of the air through the latter including ports within the wall of said housing opening into the upper and lower portions of said reservoir irrespective of the position of said housing, a rotatable shaft longitudinally disposed within said housing having air supply and lubricant conveying passages, and means on said shaft affording the communication of its passages with said ports whereby air is admitted into the upper portion and lubricant is conveyed from the lower portion of the reservoir in any supported position of the lubricator.

2. In a lubricator, a housing having a substantially cylindrical lubricant reservoir and an air conduit, means for conveying lubricant from said reservoir to said air conduit during the flow of the air through the latter including a series of radially disposed ports within the end walls of said reservoir opening into the latter, a rotatable element extending from one of said end walls to the other and having air supply and lubricant conveying pasages, and means on said element affording the communication of said passages with said ports whereby air is admitted into the upper portion and lubricant is conveyed from the lower portion of the reservoir in any supported position of the lubricator.

3. In a lubricator, a housing having a substantially cylindrical lubricant reservoir and an air conduit through said housing within the side wall thereof, means for conveying lubricant from said reservoir to said air conduit during the flow of the air through the latter including an element through said reservoir rotatably supported within the end walls of the latter, ports within the end walls of said reservoir extending radially from said element and opening circumferentially into the reservoir, and means on said element including passages capable of communication with some of said ports for admitting air into the upper portion and conveying lubricant from the lower portion of the reservoir in any supported position of the lubricator.

4. In a lubricator, a housing having a substantially cylindrical lubricant reservoir and an air conduit through said housing, means for conveying lubricant from said reservoir to said air conduit during the flow of the air through the latter including an element through said reservoir rotatably supported within the end walls of the latter, ports immovable relative to the housing extending radially from said element and opening circumferentially into the reservoir, and means on said element including passages affording the communication of said air conduit with some of said ports for admitting air into the upper portion of the reservoir and with other of said ports for conveying lubricant from the lower portion of the reservoir into said air conduit in any supported position of the lubricator.

5. In a lubricator, a housing having a lubricant reservoir and a pressure fluid conduit, means for supplying lubricant from the reservoir to said conduit during the flow of the pressure fluid through the latter and in any supported position of the lubricator including movable pressure fluid supply and lubricant conveying passages within said housing in constant communication with said pressure fluid conduit, a plurality of ports immovable relative to the housing and opening into the reservoir for supplying pressure fluid into and conveying lubricant from the reservoir dependent upon the supported position of the lubricator and the consequential communication of said pressure fluid supply and lubricant conveying passages with said ports, and means for automatically preventing the conveyance of lubricant from the reservoir when the supply of pressure fluid to said pressure fluid supply passage is shut off.

6. In a lubricator, a housing having a substantially cylindrical lubricant reservoir and a pressure fluid conduit, means for conveying lubricant from the lower portion of the reservoir to said conduit during the flow of the pressure fluid through the latter and for venting the upper portion of the reservoir into said conduit immediately after the flow of the fluid therethrough is interrupted, said means including a plurality of radially disposed ports within the end walls of said reservoir affording constant communication with the upper and lower portion of the reservoir irrespective of the supported position of the lubricator, and a movable element within said reservoir formed with passages affording the constant communication of the pressure fluid conduit with the ports opening into the upper and lower portions of the reservoir.

7. In a lubricator, a housing having a lubricant reservoir and a pressure fluid conduit, means for supplying lubricant from said reservoir to said conduit during the flow of the pressure fluid through the latter including a plurality of ports stationary relative to said housing, some of said ports opening into the upper portion and other opening into the lower portion of the reservoir in any supported position of the lubricator, and an element movable within said housing having pressure fluid supply and lubricant conveying passages capable of communication with the ports opening into the upper and lower portions of the reservoir irrespective of any angular and endwise tilted positions of the lubricator for supplying pressure fluid from said conduit to the upper portion of the reservoir and conveying lubricant from the lower portion of the reservoir into said conduit.

8. In a lubricator, a housing formed with an internal chamber constituting a lubricant reservoir, a compressed air conveying passage within the wall of said housing, means for conveying lubricant from said reservoir to said passage during the flow of the compressed air through the latter including a rotatable and longitudinally slidable element within said housing having compressed air supplying passages and lubricant conveying passages communicating with said reservoir through ports formed within the wall of said housing, and means carried by said element causing said compressed air supplying passages to be constantly located above said lubricant conveying passages in any supported position of the lubricator.

9. In a lubricator, a housing having a substantially cylindrical lubricant reservoir and a pressure fluid conveying conduit extending through said housing, a movable element within said housing extending through said reservoir, ports leading radially from said element and opening into said reservoir near the internal peripheral wall thereof, said element having passages capable of communication with said ports for admitting pressure fluid into said reservoir and lubricant into said conduit, said element being rotatable and longitudinally slidable upon movement of the lubricator to assure the communication of said passages with said ports for conducting pressure fluid through said ports into the uppermost portion of said reservoir and conducting lubricant into said conduit from the lowermost portion of said reservoir irrespective of the position of the lubricator, and adjustable means for controlling the amount of lubricant admitted into said conduit.

10. In a lubricator, a housing having a lubricant reservoir, a pressure conveying conduit extending through said housing, an element gravitationally slidable within said housing, ports leading from said element into the uppermost and lowermost portions of said reservoir irrespective of the position of said housing, two sets of passages on said element capable of communication with said ports for admitting motive fluid into the uppermost portion of said reservoir and for conveying lubricant from the lowermost portion of said reservoir into said conduit, said sets of passages being alternatively movable into and out of communication with said ports upon the slidable movement of said element to assure the admission of the pressure fluid into the uppermost and the conveyance of lubricant from the lowermost portions of said reservoir.

11. In a lubricator, a casing having a lubricant reservoir and a fluid conduit extending through the housing, a plurality of ports stationary relative to said housing with at least one of them opening into the lowermost portion of the reservoir irrespective of the position of the lubricator, and means including a movable passageway affording the constant communication of said one port with said conduit for conducting lubricant from the lowermost portion of the reservoir into said conduit.

12. In a lubricator, a casing having a lubricant reservoir and a fluid conduit extending through the casing, an element rotatably mounted in the casing having lubricant conveying means leading into said conduit, passages stationary relative to said housing with at least one of them opening into the lowermost portion of said reservoir irrespective of the position of the lubricator, and means on said element effecting its rotation during movements of the lubricator whereby said lubricant conveying means is in constant communication with said one passage for conducting lubricant from the lowermost portion of the reservoir into said conduit.

13. In a lubricator, a housing having a reservoir with lubricant stored therein and a pressure fluid conveying passage, means for conveying lubricant from said reservoir to said passage during the flow of the pressure fluid through the latter including a rotatable shaft longitudinally disposed within said housing having pressure fluid supply and lubricant conveying passages communicating with said reservoir, and means including ports within the wall of said casing affording the outlet end of said pressure fluid supply passages to remain located above and the inlet end of said lubricant conveying passages to remain located below the level of the lubricant within said reservoir in any supported position of the lubricator.

JOHN C. CURTIS.